US006424675B1

(12) United States Patent
Macdonald et al.

(10) Patent No.: US 6,424,675 B1
(45) Date of Patent: Jul. 23, 2002

(54) SYSTEM AND METHOD FOR IMPLEMENTING V.90 CENTRAL SITE MODEM FUNCTIONALITY AT A CUSTOMER PREMISES

(75) Inventors: Alistair Malcolm Macdonald, Oldsmar; Keith R. Nauman, Treasure Island, both of FL (US)

(73) Assignee: Paradyne Corporation, Largo, FL (US)

(*) Notice: Subject to any disclaimer, the term of this patent is extended or adjusted under 35 U.S.C. 154(b) by 0 days.

(21) Appl. No.: 09/368,328

(22) Filed: Aug. 3, 1999

Related U.S. Application Data

(60) Provisional application No. 60/095,379, filed on Aug. 5, 1998.

(51) Int. Cl.[7] .................................. H04L 5/16
(52) U.S. Cl. ........................ 375/222; 455/557
(58) Field of Search .................. 375/222, 342, 375/366, 341, 259; 379/93, 34, 229, 93.11, 93.28, 100.112, 93.07; 455/425, 408, 557, 560

(56) References Cited

U.S. PATENT DOCUMENTS

| | | | | |
|---|---|---|---|---|
| 5,528,679 A | | 6/1996 | Taarud | 379/34 |
| 5,812,075 A | * | 9/1998 | Betts et al. | 341/94 |
| 5,901,205 A | * | 5/1999 | Smith et al. | 379/93.01 |
| 5,903,615 A | | 5/1999 | Thomson et al. | 375/346 |
| 5,946,386 A | * | 8/1999 | Rogers et al. | 379/265 |
| 5,963,622 A | * | 10/1999 | Walsh | 379/93.33 |
| 6,104,730 A | * | 8/2000 | Marks | 370/523 |
| 6,275,502 B1 | * | 8/2001 | Arimilli | 370/468 |
| 6,317,419 B1 | * | 11/2001 | Olafsson et al. | 370/292 |

* cited by examiner

Primary Examiner—Chi Pham
Assistant Examiner—Emmanuel Bayard
(74) Attorney, Agent, or Firm—Thomas, Kayden, Horstemeyer & Risley, L.L.P.

(57) ABSTRACT

A system and method for communication allows a V.90 modem located at a customer premises to appear as a "central site" modem to a V.90 "end-point" modem located remotely from the customer premises "central site" V.90 modem. The customer premises includes a communication device that provides a four wire digital connection to the customer premises V.90 modem co-located with the communication device at the customer premises. Because the V.90 modem located at the customer premises has a four wire digital connection to a public switched network, it appears to a remote "end-point" V.90 modem that the customer premises V.90 modem is a "central site" modem. In this manner, a higher data rate is achievable from a customer premises "end-point" modem to either a remote "endpoint" modem or a remote "central site" modem, than is achievable from the "end-point" modem to the customer premises "central site" modem. This results in an upstream data rate approaching 56Kb/s from the customer premises "central site" modem to the "end-point" modem.

17 Claims, 4 Drawing Sheets

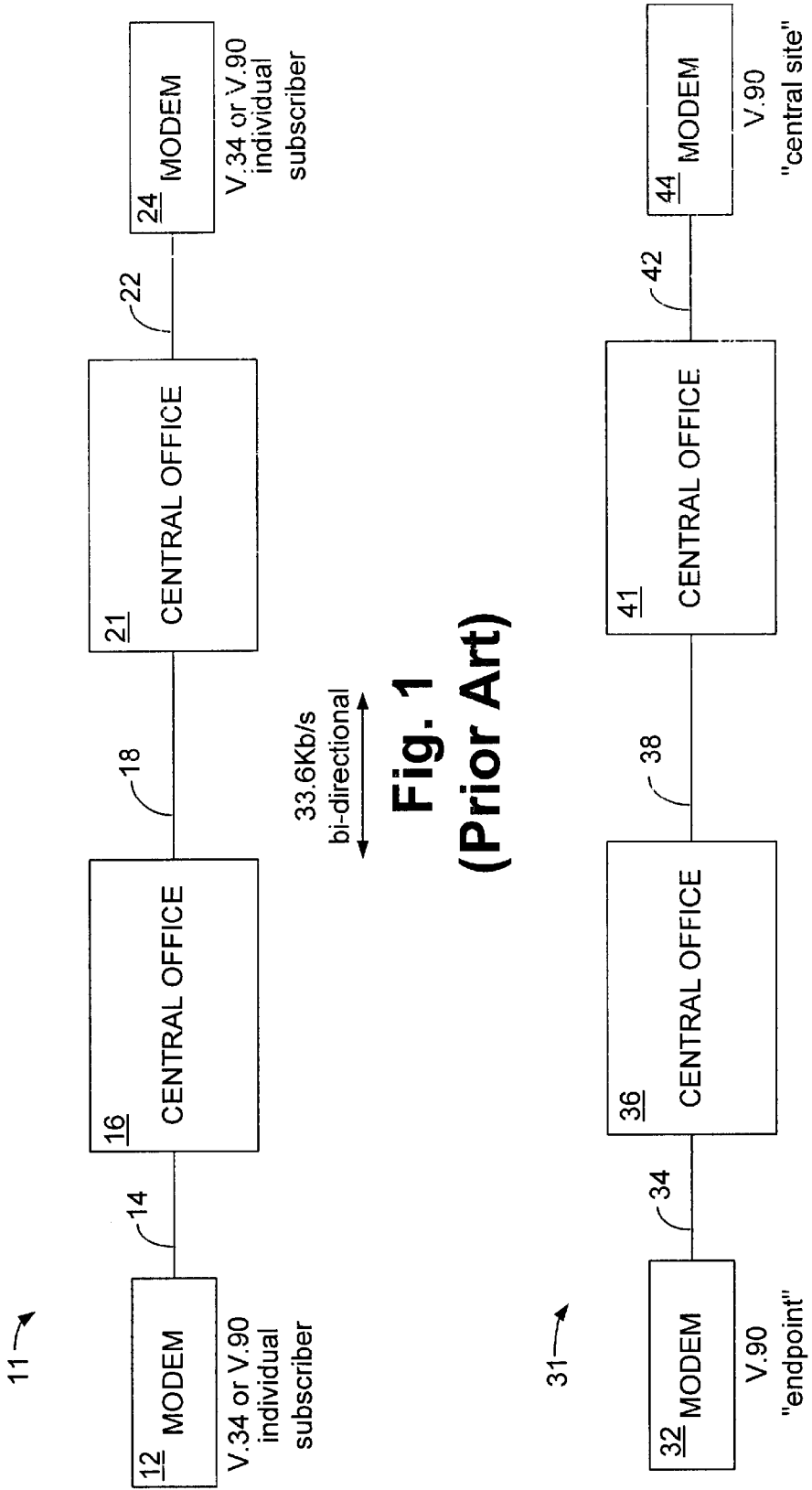

SYSTEM AND METHOD FOR IMPLEMENTING V.90 CENTRAL SITE MODEM FUNCTIONALITY AT A CUSTOMER PREMISES

CROSS REFERENCE TO RELATED APPLICATIONS

This application claims priority to and the benefit of the filing date of provisional patent application entitled IMPLEMENTATION OF CENTRAL SITE V.90 MODEM FUNCTIONALITY AT A CUSTOMER PREMISES, assigned Ser. No. 60/095,379, and filed Aug. 5, 1998, the text of which is hereby incorporated herein by reference.

TECHNICAL FIELD

The present invention relates generally to data and voice communications, and more particularly, to a system and method for implementing V.90 central site mode functionality at a customer premises.

BACKGROUND OF THE INVENTION

Modern data and voice communications have progressed to a point at which it is now possible to implement communication systems that are capable of delivering very large amounts of information to individual customer premises locations. For example, it is possible to implement digital subscriber line (DSL) technology at a residential location over the existing copper wire pair that has served in the past to support only a plain old telephone service (POTS) communication system. Other digital technology, similar in the service provided but differing in the approach in which implemented, is also available in addition to the above mentioned DSL technology. Examples of this technology include multiple virtual lines (MVL), asymmetric digital subscriber lines (ADSL), etc., whereby the result is the establishment of a digital communication interface at a customer premises, the digital connection provided over a single copper wire pair.

One of the benefits of this digital technology is the ability to provide a high speed data connection (on the order of 128 kilobits per second (Kb/s) and higher), while simultaneously providing an embedded channel over which conventional voice traffic may be communicated.

Unfortunately, there remain many customer premises locations to which the latest digital technology is unavailable, or at which the customer has chosen an existing analog communications technology, such as an analog modem, with which to send and receive information. The latest and fastest analog modems are ones that comply with the V.90 communication standard and connect a customer premises, also referred to as an "end-point" to a telephone company central office via a conventional copper wire pair. Typically, the central office to which the end-point V.90 modem is connected is connected to another central office via a four wire digital connection, such as a T1/E1, synchronous optical fiber network (SONET) or some other high speed, high capacity digital connection. This network can be a public switched telephone network (PSTN), a public data network (PDN), or the like.

The above-mentioned two wire connection is one in which signals traveling in both directions are combined over the single wire pair, while the four wire connection maintains the signals traveling in each direction on a separate wire pair.

This central office typically connects via a four wire digital connection to another modem compatible with the V.90 specification. This modem is typically referred to as a "central site" modem, and typically resides at a service provider location, such as an Internet service provider (ISP). So, in this communication scheme, one of the V.90 modems must connect to a central office via a digital four wire interface in order to provide communication services to a customer premises, or end-point. In the above-described V.90 communication environment, the data transfer rate between the end-point and the central site is asymmetrical. For example, it is possible to achieve a data rate approaching approximately 56 Kb/s in the downstream direction (from central site to end-point), but the data rate in the upstream direction (end-point to central site) is limited to approximately 33.6 Kb/s because of the analog two wire connection between the end-point V.90 modem and the central office serving the end-point.

While there are some situations in which this asymmetrical data transfer may be acceptable, there are other instances in which it would be desirable to have the ability to transfer data from an end-point to a central site at a faster rate.

FIG. 1 is a block diagram illustrating an existing point-to-point analog communication environment 11. Communication environment 11 is said to be point-to-point because it typically involves communication between two individual subscribers, commonly referred to as "endpoint" locations. For example, modem 12 connects to central office 16 via two wire analog connection 14, and modem 24 connects to central office 21 via two wire analog connection 22. Modem 12 may be located at a customer premises and modem 24 may be located at a remote customer premises. The two wire analog connections 14 and 22 are the copper wire pair that extends between a telephone company central office and an individual subscriber location, and are sometimes referred to as the "subscriber loop".

Central office 16 typically connects to central office 21 via four wire digital connection 18. The four wire digital connection 18 is typically a high speed trunk comprised of, for example but not limited to, T1/E1, or a synchronous optical network (SONET). This four wire digital connection 18 is typically the high speed backbone that interconnects a plurality of telephone company central offices.

In the above-described point-to-point communication environment 11, the maximum bi-directional data transfer speed is typically on the order to 33.6 kilobits per second (Kb/s). The data rate is typically limited by two wire analog connections 14 and 22 because, in order to maintain bidirectional communication over two wires, it is necessary to filter the transmit and receive signals in order to eliminate interference. This filtering typically limits the data rate over the two wire analog connection to a maximum of approximately 33.6 Kb/s.

While modems 12 and 24 may be capable of higher speed communications, they are typically limited by the two wire analog connection 14 and 22. For example, it is possible to install a modem complying with the V.90 standard, however, because of the two wire analog connection that exists between each modem and its respective central office, the maximum achievable speed over the two wire analog connection is limited to approximately 33.6 Kb/s by the V.34 standard. It would be desirable to have the ability to implement a higher data rate from modem 12 to modem 24, or to another endpoint modem (not shown).

FIG. 2 is a block diagram illustrating an existing V.90 communication environment 31 The communication environment 31 shown in FIG. 2 is similar to point-to-point communication environment 11 with the exception that a four wire digital connection 42 exists between central office 41 and modem 44. Modem 32, which is compatible with the V.90 standard, is considered an end-point modem and is located at an individual subscriber location. Modem 32 connects to central office 36 via the above-mentioned two wire analog connection 34. Central office 36 connects to central office 41 via a four wire digital connection 38, that is similar to four wire digital connection 18 described above with respect to FIG. 1.

Typically, modem 44, which also complies with the V.90 communication standard, is considered a central site modem and is generally located at a service provider location. An example of a service provider location would be an Internet service provider (ISP). Because modem 44 is located at a service provider location that typically has access to a four wire digital connection to central office 41, it is possible to implement a higher data rate in the direction of central site modem 44 towards end-point modem 32. This direction is typically referred to as the "downstream" direction. When central site modem 44 and end-point modem 32 are operating in compliance with the V.90 standard, the data rate between central site modem 44 and end-point modem 32 approaches 56 Kb/s.

The data rate in the "upstream" direction, which is the direction from end-point modem 32 to central site modem 44, is still limited to a maximum data rate of approximately 33.6 Kb/s because of the two wire analog connection 34 between end-point modem 32 and central office 36.

This scheme works well in the situation where it is desirable to have a faster data rate from central site modem 44 to end-point modem 32 than from end-point modem 32 to central site modem 44. However, there are instances when it would be desirable to have the ability to implement a higher data rate in the direction from end-point modem 32 to central site modem 44.

SUMMARY OF THE INVENTION

The invention allows a customer premises, or end-point, communication location to appear to a remote end-point location as a central site communication location. The invention provides a communication system, comprising: a first communication device including a digital connection residing at a first location; a second communication device coupled to the first communication device, the second communication device residing at a second location remote from the first location; and a V.90 modem coupled to the first communication device via the digital connection.

The invention may also be conceptualized as a method for communication, comprising the steps of: coupling a first communication device including a digital connection, the first communication device residing at a first location, to a V.90 modem via the digital connection; coupling a second communication device residing at a second location that is remote from the first location to the first communication device; and communicating from the first communication device to the second communication device at a rate faster than a communication rate from the second communication device to the first communication device.

The invention has numerous advantages, a few of which are delineated hereafter, as merely examples.

An advantage of the invention is that it permits a customer premises, or end-point, communication location to appear to another communication end-point as a central site.

Another advantage of the invention is that it allows a communication end-point to communicate with another communication end-point, or with a service provider, at data rates that have been heretofore unachievable.

Another advantage of the present invention is that it is simple in design, reliable in operation, and its design lends itself to economical mass production in modems.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

FIG. 1 is a block diagram illustrating an existing point-to-point analog communication environment;

FIG. 2 is a block diagram illustrating an existing V.90 communication environment;

DETAILED DESCRIPTION OF THE PREFERRED EMBODIMENT

The present invention can be implemented in software, hardware, or a combination thereof In the preferred embodiment, the elements of the present invention are illustrated as discrete elements that can be implemented in software that is stored in a memory and that configures and drives a suitable digital signal processor (DSP) situated in the communication device to execute the communication functions. While the invention is illustrated using discrete components, the invention may be wholly implemented in a single chip set that is configured to execute the foregoing software program.

The foregoing program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
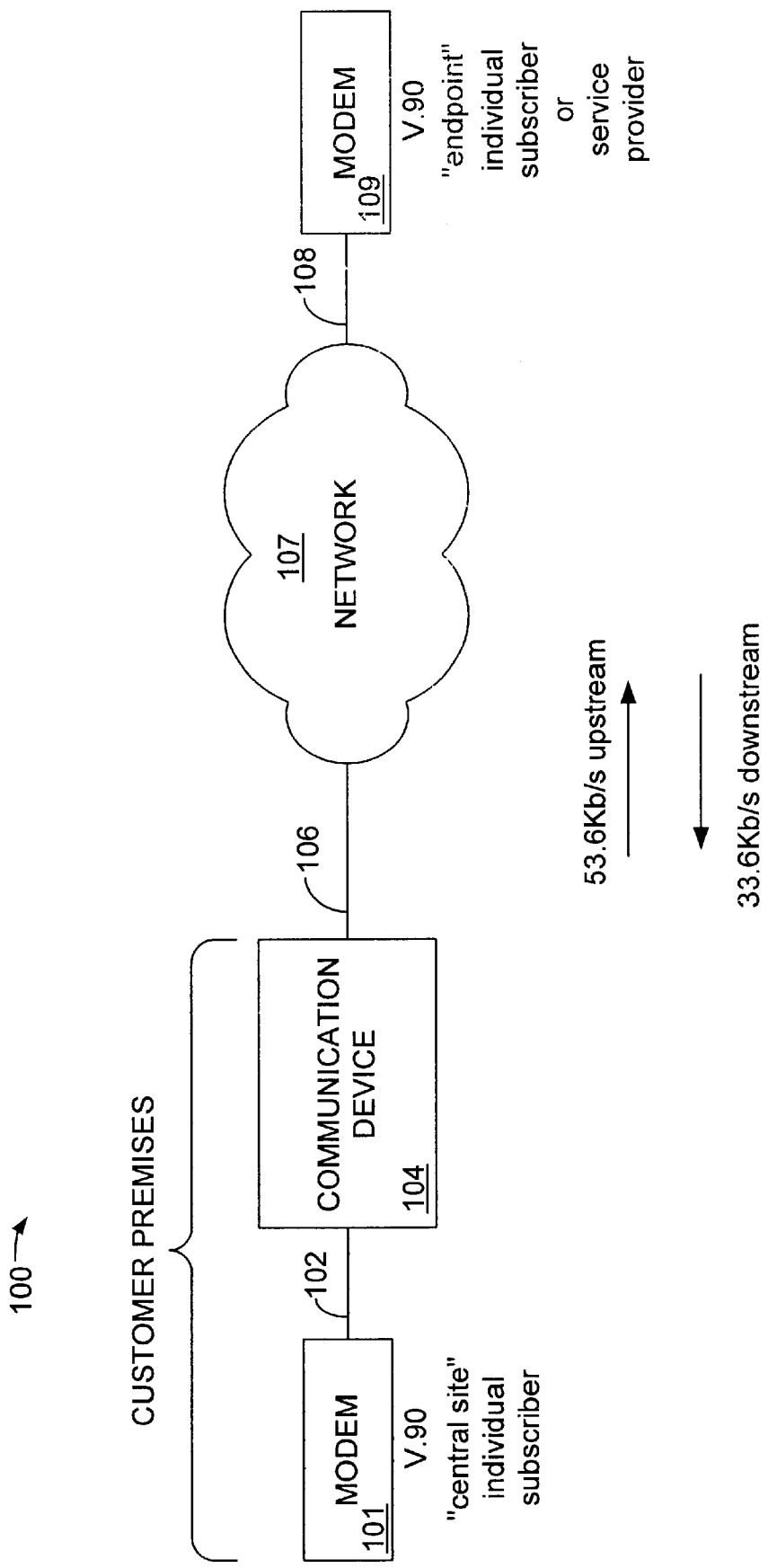
FIG. 3 is a block diagram illustrating a communication environment in accordance with the invention.

FIG. 3 is a block diagram illustrating a communication environment 100 in accordance with the invention. Communication environment 100 includes modem 101, which complies with the V.90 communication standard, connected to communication device 104 via four wire digital connection 102. Modem 101 and communication device 104 may both reside at a customer premises location. Communication device 104 can be any digital communication device that provides a digitally derived voice channel and a four wire digital connection 102. For example, communication device 104 may be a digital subscriber line (DSL) device, an asymmetric digital subscriber line (ADSL) device, or any other communication device that provides a digital communication interface. Furthermore, communication device 104 is typically capable of providing an embedded digital voice channel over which voice communication occurs.

Communication device 104 connects to network 107 via a two wire digital communication channel 106. The two wire digital channel 106, while comprising the copper wire pair as mentioned above, is used to provide an all digital communication signal between communication device 104 and network 107. Communication device 104 allows two wire digital channel 106 to carry all digital high frequency data having an embedded voice channel in the digital domain. Furthermore, while two wire digital channel 106 is physically comprised of a signal wire pair, two wire digital channel 106 is logically a four wire interface. Typically, the communication device 104 executes an all digital communication scheme over two wire digital channel 106 via some manner of band separation in which the transmit and receive frequencies are isolated from each other.

Network 107 can be any network capable of transporting digital information, and is typically a public switched telephone network (PSTN), a public data network (PDN), or any other network capable of transporting information over a four wire digital type connection.

End-point modem 109 connects to network 107 via two wire analog connection 108. Modem 109 also complies with the V.90 communication standard and is considered to be an end-point modem. However, while considered an end-point modem, modem 109 may reside at either an individual subscriber location or at a service provider location.

In accordance with the invention, central site modem 101 is provided a four wire digital interface 102 from communication device 104. The four wire interface 104 provided to modem 101 permits modem 101, which resides at a customer premises, to appear to modem 109 as a central site modem. In this manner, it is possible to achieve a data rate approaching 56 Kb/s from modem 101 to modem 109. This allows nearly a 56 Kb/s upstream data rate if modem 101 is located at a customer premises and modem 109 is located at a service provider location. If modem 109 is an end-point modem located at a remote customer premises location, the data transfer rate from modem 109 to modem 101 is now limited to a maximum of approximately 33.6 Kb/s due to the two wire analog connection 108 between modem 109 and network 107. In this manner, although modem 101 is located at a customer premises it appears to modem 109 that modem 101 is actually a central site, thereby reversing the upstream and downstream directions for this application. For example, although modem 101 is located at a customer premises, because it appears as a central site modem, it appears that the downstream data rate, from modem 101 to modem 109 is the higher data rate approaching 56 Kb/s. In this manner, and in accordance with the invention, a V.90 modem located at a customer premises can achieve nearly a 56 Kb/s data rate to an end-point V.90 modem located at an individual subscriber location or a service provider location.

Figure 4:
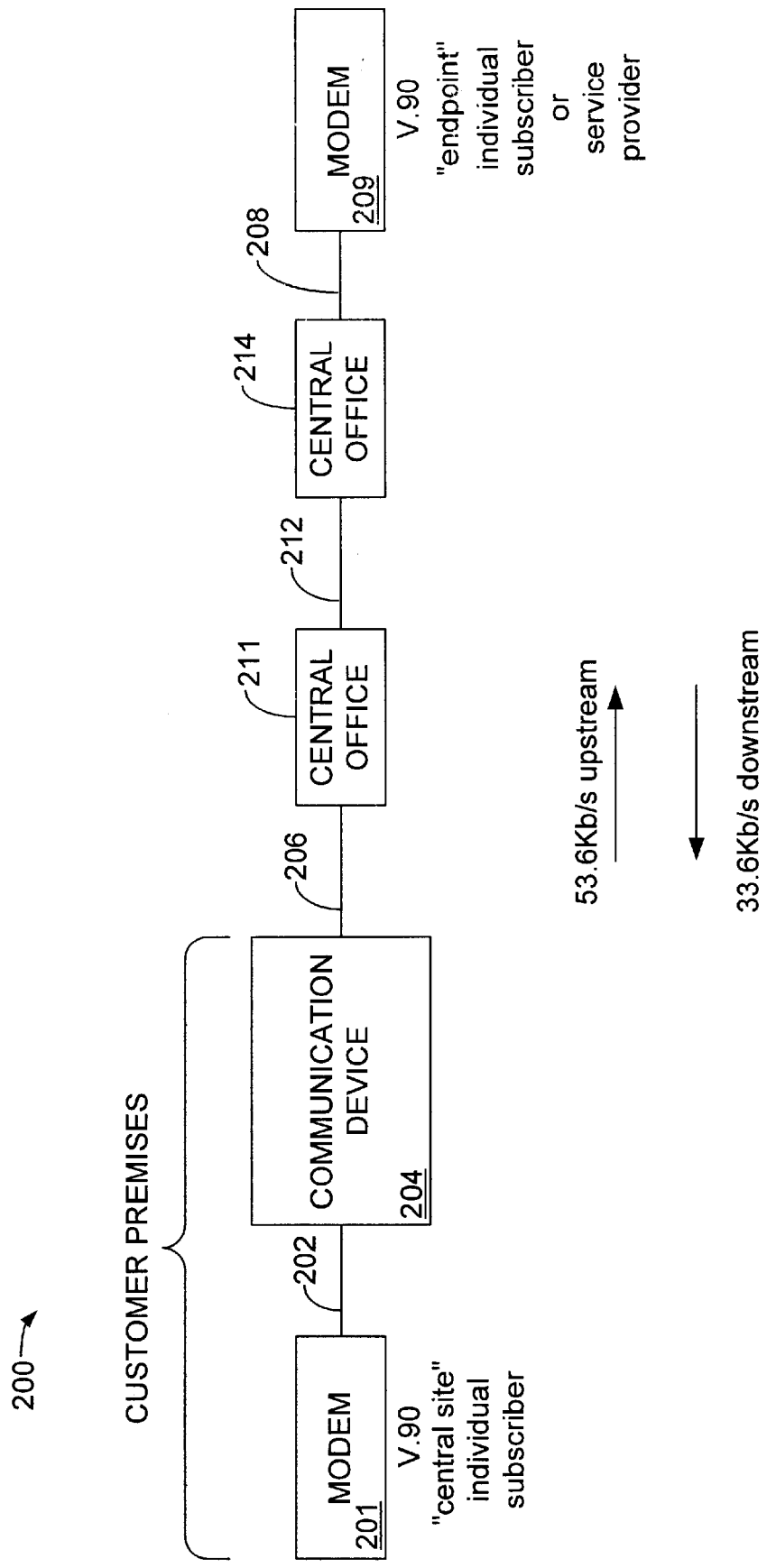
FIG. 4 is a block diagram illustrating an alternative embodiment of the communication environment of FIG. 3.

FIG. 4 is a block diagram illustrating an alternative embodiment to the communication environment of FIG. 3. Communication environment 200 includes modem 201 which connects to communication device 204 over four wire digital connection 202, in similar fashion to modem 101 and communication device 104 in FIG. 3. Communication device 204 connects over two wire digital channel 206 to central office 211. Central office 211 is typically the telephone company central office location from which the copper wire pair comprising two wire digital channel 206 extends to a customer premises location. Central office 211 connects to central office 214 via four wire digital connection 212. Four wire digital connection 212 can be, for example but not limited to, a T1/E1 connection, a SONET connection, or any other high speed four wire digital communication channel. Central office 214 connects to end-point modem 209 via two wire analog connection 208. Essentially, central office 211 and 214, which are connected by four wire digital connection 212 represent the network 107 of FIG. 3.

In the manner described above, modem 201 can send data to modem 209 at a data rate approaching 56 Kb/s, and modem 209 can send data to modem 201 at a speed approaching 33.6 Kb/s. In this manner, modem 201 appears as a central site modem to modem 209. Furthermore, it is possible to connect communication device 204 to end-point modem 209 through a single central office.

Figure 5:
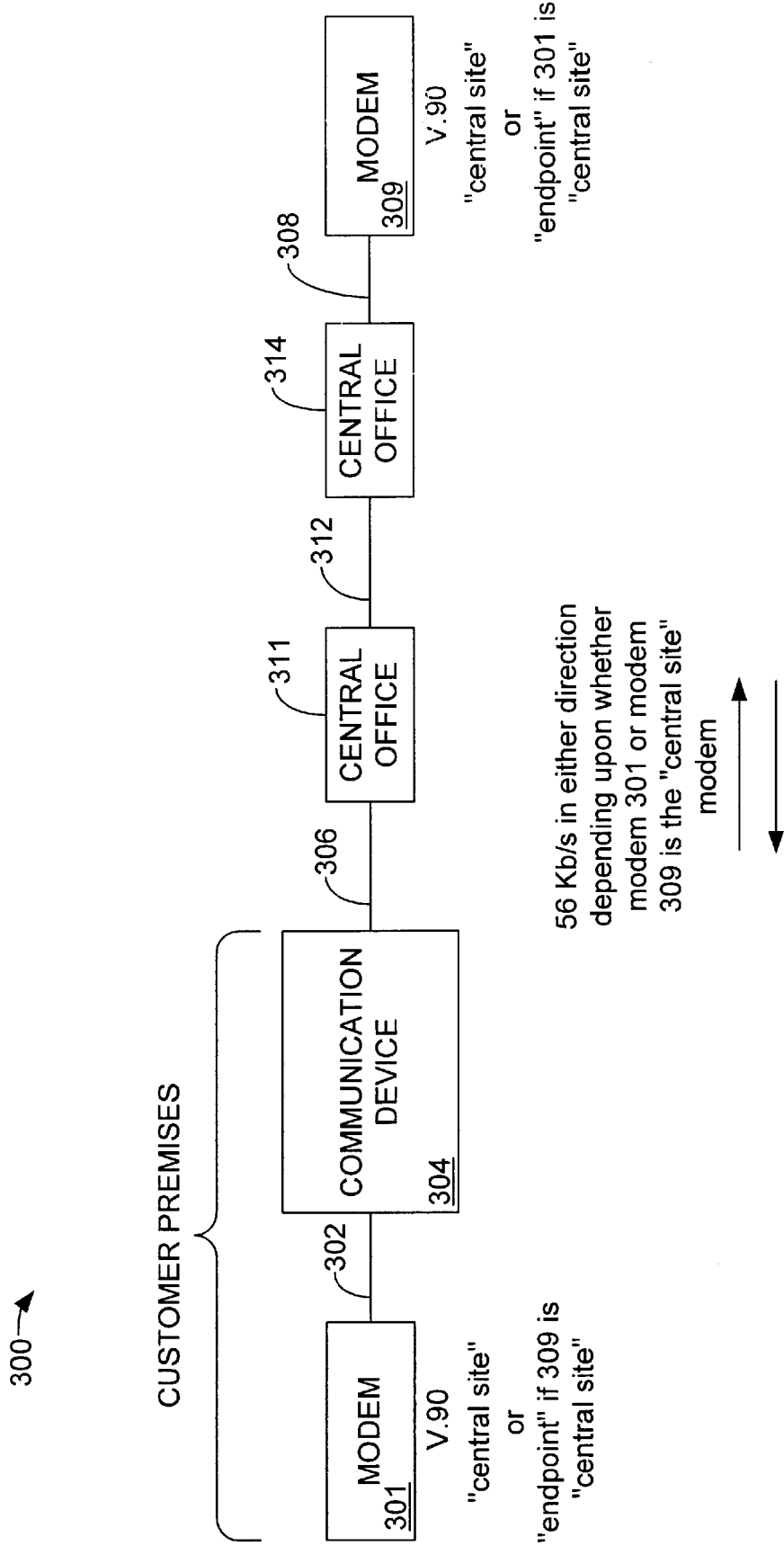
FIG. 5 is a block diagram illustrating an alternative embodiment of the communication environment of FIG. 4.

FIG. 5 is a block diagram illustrating an alternative embodiment of the communication environment of FIG. 4. Communication environment 300 includes modem 301 which connects to communication device 304 over four wire digital connection 302. Communication device 304 connects over two wire digital channel 306 to central office 311. Central office 311 is similar to central office 211 of FIG. 4 and will not be described again. Central office 311 connects to central office 314 via four wire digital connection 312. Four wire digital connection 312 is similar to four wire digital connection 212 of FIG. 4. In a departure from that described in FIG. 4, central office 314 connects to modem 309 via four wire digital connection 308. Four wire digital connection 308 allows modem 309 a digital connection to central office 314. In this manner, modems 301 and 309 may each be considered "central site" modems. While either modem 301 or 309 is performing as a central site modem, the other modem appears as an "endpoint" modem. When operating in this arrangement, data rates approaching 56 kb/s are possible in either upstream or downstream directions, depending upon which modem, 301 or 309, is functioning as the central site modem.

It will be apparent to those skilled in the art that many modifications and variations may be made to the preferred embodiments of the present invention, as set forth above, without departing substantially from the principles of the present invention. All such modifications and variations are intended to be included herein within the scope of the present invention, as defined in the claims that follow.

What is claimed:

1. A communication system, comprising:
   a first communication device including a digital connection residing at a customer premises;
   a second communication device coupled to said first communication device, said second communication device residing at a location remote from said customer premises; and
   a first digital modem coupled to said first communication device via said digital connection, wherein said first communication device having said first digital modem coupled thereto allows said first communication device to appear as a central site to said second communication device.

2. The system of claim 1, wherein said first communication device communicates to said second communication device at a rate faster than a rate at which said second communication device communicates to said first communication device.

3. The system of claim 1, wherein said first communication device includes said first digital modem.

4. The system of claim 1, wherein said first communication device is coupled to said first digital modem via a digital four wire connection.

5. The system of claim 1, wherein said first communication device is a digital subscriber line (DSL) communication device.

6. The system of claim 1, wherein said first communication device couples to said second communication device over a digital four wire connection.

7. The system of claim 1, further comprising a first central office coupled to said first communication device and a second central office coupled to said second communication device.

8. The system of claim 7, wherein said first central office couples to said second central office via a four wire digital communication channel.

9. The system of claim 1, further comprising:
   a second digital modem connected to said second communication device, said first digital modem and said second digital modem allowing digital communication to occur between said first location and said second location.

10. A method for communication, comprising the steps of:
    coupling a first communication device including a digital connection, said first communication device residing at a first location, to a first digital modem via said digital connection;
    coupling a second communication device residing at a second location that is remote from said first location to said first communication device; and
    communicating from said first communication device to said second communication device at a rate faster than a communication rate from said second communication device to said first communication device, wherein said first communication device having said first digital modem coupled thereto allows said first communication device to appear as a central site to said second communication device.

11. The method of claim 10, further comprising the step of including said first digital modem in said first communication device.

12. The method of claim 10, further comprising the step of coupling said first communication device to said first digital modem via a digital four wire connection.

13. The method of claim 10, wherein said first communication device is a digital subscriber line (DSL) communication device.

14. The method of claim 10, further comprising the step of coupling said first communication device to said second communication device over a digital four wire connection.

15. The method of claim 10, further comprising the steps of:
    coupling a first central office to said first communication device; and
    coupling a second central office to said second communication device.

16. The method of claim 15, further comprising the step of coupling said first central office to said second central office via a four wire digital communication channel.

17. The method of claim 10, further comprising the steps of:
    connecting a second digital modem to said second communication device, said first digital modem and said second digital modem allowing digital communication to occur between said first location and said second location.

* * * * *